United States Patent

Hauser

[15] 3,699,755
[45] Oct. 24, 1972

[54] CONDITIONING MACHINES FOR AGRICULTURAL STRAW OR BLADE MATERIAL OR THE LIKE

[72] Inventor: Hans Ulrich Hauser, Lienhard, Watt, Switzerland

[73] Assignee: Bucher-Guyer AG Maschinenfabrik, Niederweningen, Switzerland

[22] Filed: June 23, 1971

[21] Appl. No.: 155,799

[30] Foreign Application Priority Data

July 24, 1970    Switzerland............11290/70

[52] U.S. Cl.................................56/16.4, 56/DIG. 1
[51] Int. Cl..............................................A01d 43/00
[58] Field of Search.........56/DIG. 1, 1 R, 14.1, 16.4, 56/16.6, 192

[56] References Cited

UNITED STATES PATENTS 2,911,780    11/1959    Brady......................56/192 X
3,197,947    8/1965    Cunningham...........56/DIG. 1

FOREIGN PATENTS OR APPLICATIONS 1,154,302    9/1963    Germany................56/DIG. 1
1,500,062    9/1967    France.........................56/192
1,412,194    4/1965    France....................56/DIG. 1

Primary Examiner—Louis G. Mancene
Assistant Examiner—J. N. Eskovitz
Attorney—Karl W. Flocks

[57] ABSTRACT

A conditioning machine for agricultural straw or blade material embodying a conveying drum equipped with conveying tools or implements. The conveying drum in conjunction with a guide wall forms a conveying channel which is provided with means for exerting a conditioning action upon the conveyed straw or blade material. According to important aspects of the invention the spacing between the ends of the conditioning means situated closest to the jacket or outer surface of the conveying drum and the circular path of travel of the ends of the conveying tools is smaller than the smallest inner height of the conveying channel between the jacket of the conveying drum and the guide wall measured from the axis of rotation of the conveying drum.

30 Claims, 7 Drawing Figures

CONDITIONING MACHINES FOR AGRICULTURAL STRAW OR BLADE MATERIAL OR THE LIKE

BACKGROUND OF THE INVENTION

The present invention relates to a new and improved construction of conditioning machine for agricultural crops, especially straw or blade material or the like, and such conditioning machine is of the type embodying a conveying drum equipped with conveying tools and which drum together with a guide wall forms a conveying channel, and wherein means for exerting a conditioning action upon the conveyed straw or blade material are provided for such conveying channel.

French Pat. No. 1,600,641 teaches a prior art construction of hay conditioning machine of this general type wherein the conveying drum together with its conveying tools, during rotation thereof, exerts a destructive beating action upon the harvest or crop. Owing to the mechanical destruction, especially the stalk-like crop there is achieved a uniform and accelerated drying of the harvest or crop.

In the previously mentioned prior art construction of conditioning machine this destructive beating action is intensified by the provision of the conditioning means connected after the conveying drum. However, this requires that the conveying drum be rotated with such a high peripheral velocity that sufficient kinetic energy is imparted to the conveyed straw or blade material that the subsequently arranged means are even capable of fulfilling the desired objectives. Yet, such a high peripheral velocity can only be achieved with drums which have a relatively large diameter and which are driven at a relatively high rotational speed. Additionally, with the state-of-the-art construction of machine the required rotational speeds also cause the conveying tools to not only subject the straw or blade material to a destructive or pounding action, but also to a shearing action which comminutes the material, something which is not desired. Finally, with the known machine the high peripheral speed or velocity which is required therefore has the effect that practically only the tips of the conveying tools come into contact with the conveyed material and hence can only slightly carry out the desired destructive action.

SUMMARY OF THE INVENTION

Therefore, it will be seen from what has been discussed above that the prior art is still in need of a conditioning machine for agricultural straw or blade like material which is not associated with the aforementioned disadvantages of the heretofore known constructions of such conditioning machines. Hence, a primary objective of this invention is to provide just such improved conditioning machine which effectively and reliably fulfills the existing need in the art and overcomes the previously discussed disadvantages which are presently existent in the state-of-the-art constructions.

Still another and more specific object of the present invention is to provide a novel construction of conditioning machine of the previously mentioned general type, by means of which it is possible, with comparatively smaller peripheral velocities, to carry out a sufficient destructive action upon the straw or blade material.

In keeping with the preceding object it is a further objective of this invention to obtain a sufficient destructive action on the material without resorting to the technique of slinging or throwing the straw or blade material, rather to arrange the conveying elements or tools of the conveyor drum and the aforementioned conditioning means with respect to one another in such a manner that they perform a mutual and simultaneous reciprocal action with respect to one another.

Now in order to implement these and still further objectives of the invention which will become more readily apparent as the description proceeds the proposed conditioning machine of this invention is manifested by the features that the spacing between the ends of the aforesaid means which are situated closest to the jacket of the conveyor or conveying drum and the circular path of flight or travel of the ends of the conveying tools is smaller than the smallest internal height of the conveying channel between the jacket of the drum and the guide wall measured from the axis of rotation of the drum.

A particularly advantageous and intensive conditioning effect can be then achieved if such means are arranged transverse to the conveying direction in offset relationship with respect to the revolving path of travel of the conveying tools of the conveying drum and penetrate with their ends the outer surface of generatrix of such circular path of travel of the conveying tools.

Stalk-like harvest or crop requires an intensified conditioning action, whereas crops which are rich in blades require a more protective conditioning action. It is advantageously possible to accommodate the conditioning action to such different crop requirements if the spacing of the conditioning means with respect to the conveying drum is adjustable.

In a preferred embodiment of the invention the conditioning means constitute teeth of a comb which engage into the conveying channel from the guide wall at an acute angle with respect to the conveying direction.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
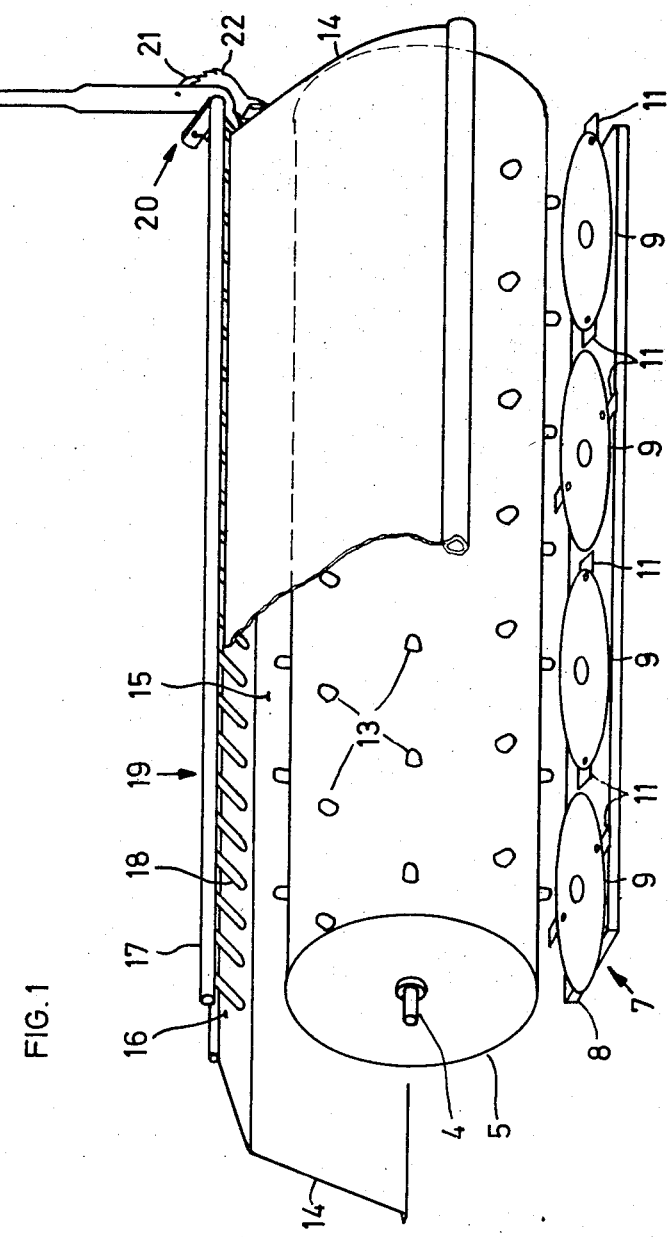
FIG. 1 is a perspective view of a hay conditioning machine combined with a disc mower into a machine unit.
Figure 2:
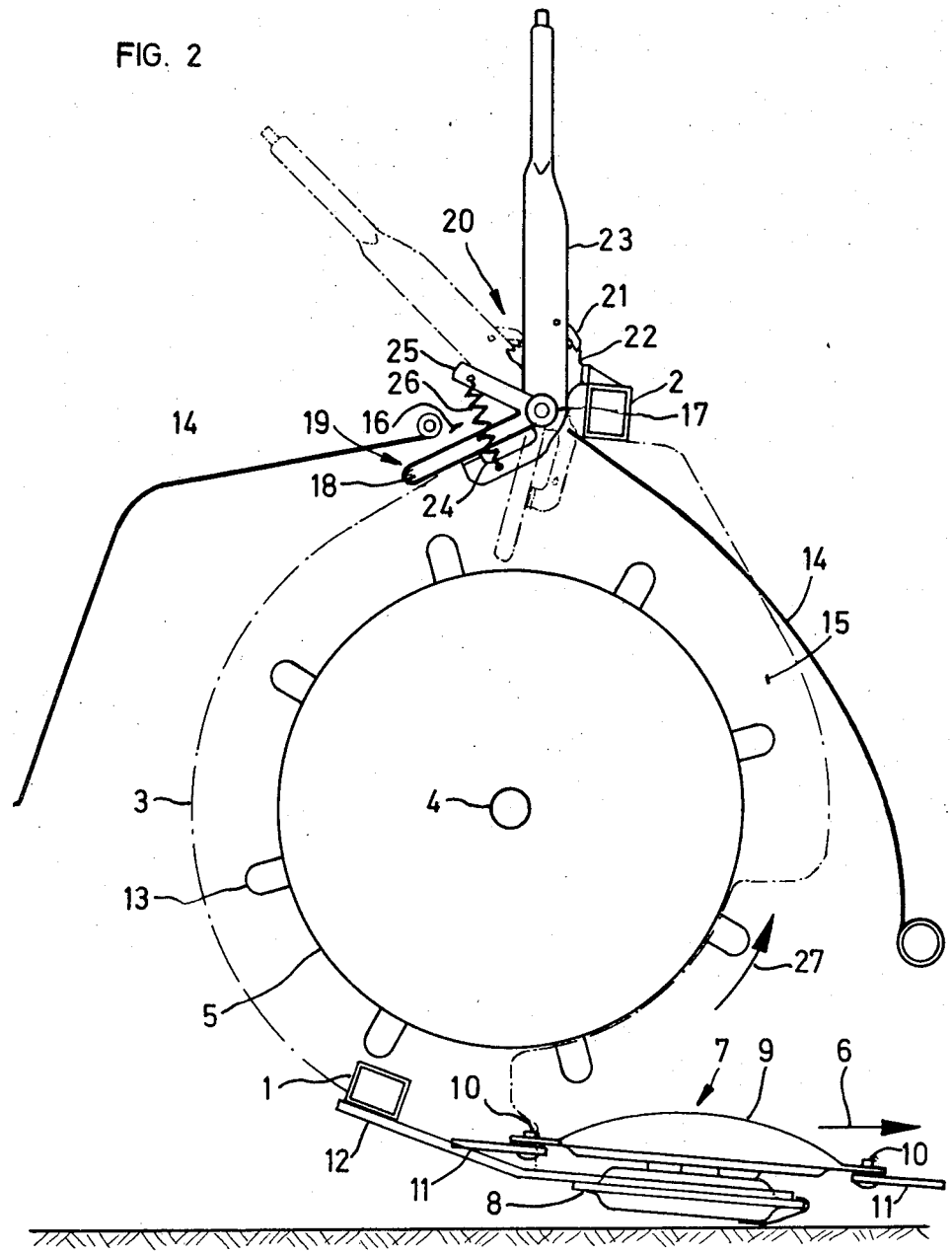
FIG. 2 is an enlarged side view of the machine unit depicted in FIG. 1.

Describing now the drawings and as will be readily apparent by referring to FIG. 2 a lower transverse support 1, an upper transverse support 2 and a respective support plate 3 which, for the sake of preserving clarity in illustration have only been shown in phantom lines in FIG. 2, and laterally connected with both transverse carriers 1 and 2, collectively form a machine frame for the hay conditioning machine as best shown in FIGS. 1 and 2, and at which there is rotatably mounted, by means of a horizontally extending shaft 4, a conveyor or conveying drum 5.

Arranged forwardly of the conveying drum 5 with respect to the direction of travel of the machine unit, as indicated by the arrow 6, is a disc mower 7. With regard to this disc mower 7 it will be seen that four discs 9 are rotatably mounted upon a drive or transmission housing 8 which can slide along the ground, these discs 9 being rotatably driven in pairs so as to rotate in opposite sense by means of any suitable drive or transmission accommodated at the transmission housing 8. Now as clearly seen by referring to FIG. 2 by means of bolts 10 there are pivotably connected to each of the mower discs 9 two respective diametrically oppositely situated cutting tools 11, with two cutting tools 11 of one disc 9 being synchronously rotated in offset relationship through an angle of 90° with respect to the cutting tools 11 of the neighboring disc 9.

The transmission housing 8 is fixedly connected through the agency of two lateral carriers 12 with the lower transverse carrier 1 so that the conveying drum 5 and the disc mower 7 form a machine unit which, when assuming its working position, rests upon the ground. This machine unit can be attached in conventional fashion through the intermediary of nonillustrated coupling means with an agricultural tractor or similar vehicle and by means of the power take-off shaft thereof can be appropriately driven and by means of conventional lifting mechanism can be raised from the ground when it is placed out of its operating position.

The conveying drum 5 is equipped at its jacket or surface with conveying tools 13 which are here shown, by way of example, constructed as round pins closed at their free ends and distributively arranged at a uniform spacing over the entire width of the conveying drum 5. Arranged in overlying relationship with respect to the conveying drum 5 is a guide wall 14 which delimits a conveying channel 15 towards the top of the machine unit and which approximately at its highest location is equipped with an opening 16 extending over the entire length of the guide wall 14. This opening 16 is covered by a comb unit 19 consisting of a comb spine or back portion 17 and the comb teeth 18, comb unit 19 being pivotably mounted in any suitable fashion at its ends externally of the conveying channel 15 at the machine frame. There is also provided an adjustment mechanism 20 for the comb unit 19, and such carries an adjustment lever 23 which can be selectively engaged by means of its pawl 21 at a segment or ratchet portion 22 of a rigid plate 24 at which the comb unit 19 is freely supported. By means of a tension spring 26 which is suspended at one end at the plate 24 and at the other end at a strut 25 which is rigidly connected for rotation with the comb unit 19 is possible to draw such comb unit 19 in the direction towards the plate 24. By means of the adjustment lever 23 it is possible to rock the comb unit 19 out of a raised inoperable position, as shown in FIG. 2, into the phantom line operable position which can be selected in accordance with the engagement location of the pawl 21 at the ratchet segment 22.

The grass which is mowed by the disc mower assembly 7, during such time as the conveying drum 5 is rotating in the direction of the arrow 27, is engaged by the conveying tools 13 directly at the region of the discs 9 and further conveyed into the conveying channel 15, finally deposited behind the conveying drum 5 upon the ground. During its conveying movement through the conveying channel 15 this grass is positively moved past the comb teeth 18 of the comb unit 19 which, in turn, exert a destructive action upon the conveyed material. The cooperative coaction of the conveying tools 13 with the comb teeth 18 which are disposed in an uninterrupted sequence adjacent one another produces the desired action contemplated by the invention upon the conveyed material, especially the bending or folding of the stalk-like straw material, and wherein fodder which is rich in blades or leaves is more likely subjected to a protective treatment. A pronounced conditioning action can then be realized if the comb teeth 18 engage into the location of the revolving circular path of travel of the conveying tools 13 of the conveying drum 5. This thus obtained additional action can be appropriately defined as a jet or stream effect. Advantageously, the conditioning action which can be exerted upon the grass or the like can be regulated in that, by suitable manipulation of the adjustment lever 23 it is possible to regulate the penetration depth to a larger or greater extent of the comb unit 19 into the conveying channel 15.

Figure 3:
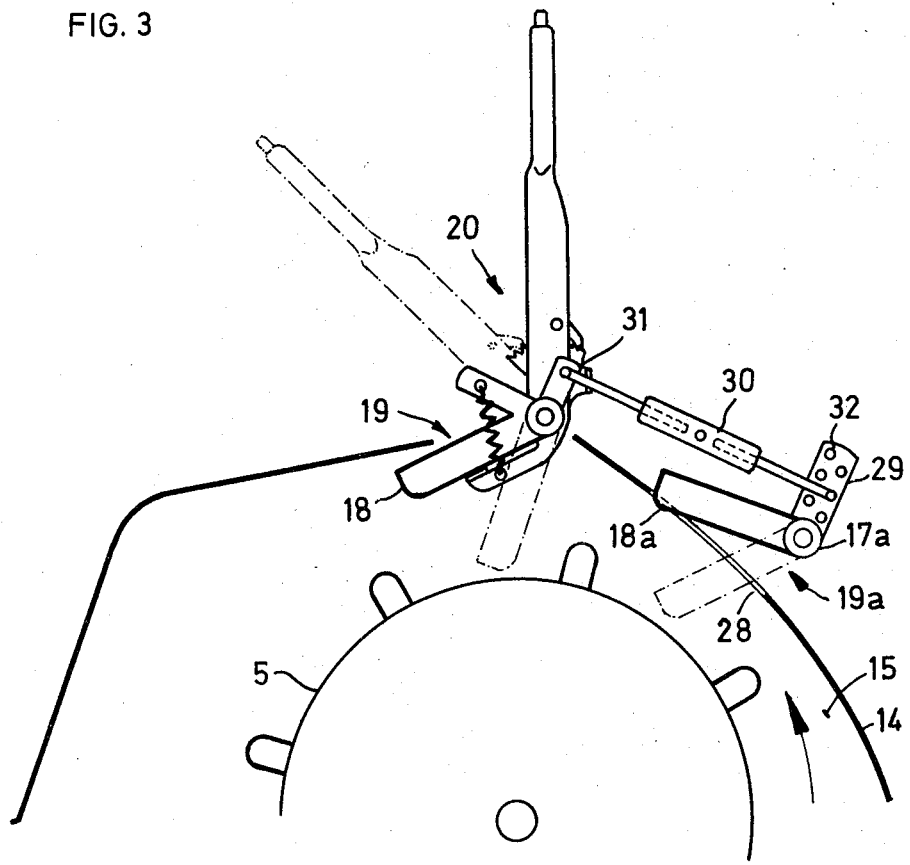
FIG. 3 is a side view of a hay conditioning machine equipped with two comb devices arranged in tandem or behind one another.

As clearly indicated by referring to FIG. 3 here also a similar conditioning machine again possesses a conveying drum 5 and a guide wall 14 which overlies a conveying channel 15 formed between the outer surface of the guide drum and the inner wall of this guide wall 14. The conditioning machine also has a comb unit 19, the comb teeth 18 of which, as a variation of the preceding exemplary embodiment, here possess a substantially rectangular cross-sectional configuration. This comb unit 19 is likewise positionably adjustable by means of a similar adjustment mechanism 20 as previously discussed in conjunction with the embodiment of FIG. 2. This comb or comb unit 19 is attached to a further comb or comb unit 19a which likewise possesses a comb spine 17a to which there are anchored the comb teeth 18a. A lever 29 is seated upon the comb spine or back portion 17a. Lever 29 is operatively coupled through the agency of a turnbuckle 30 or similar device with a further lever 31 which is seated upon the comb spine 17 of the comb unit 19. Due to this connection and construction of the equipment it is possible to simultaneously place both comb units 19 and 19a, by means of the adjustment mechanism 20, in and out of their operable position and to adjust such into different working positions. The guide wall 14 is provided with slot means 28 of a size constructed in accordance with the thickness of the likewise rectangular comb teeth 18a and through which the comb teeth 18a can be rocked or pivoted. The lengthwise adjustability of the turnbuckle 30 permits both combs 19 and 19a to be adjustable into different inclined positions relative to one another.

The lever 29 of the comb unit 19a possesses a number of perforations or holes 32 at which there can be selectively articulated the turnbuckle 30. Through selection of a different lever spacing of both hinge points of the turnbuckle 30 with respect to the associated points of rotation of both combs 19 and 19a it is possible to adjust the latter into different relationships with respect to one another. By virtue of the tandem arrangement of two combs 19 and 19a with the described individual adjustment possibility, it is possible, on the one hand, to achieve a more intensive conditioning action and, on the other hand, to attain a better accommodation to the different grass or crop conditions, in that especially only one or both combs can be placed into operable position and, in turn, both combs can be placed in different work positions.

Figure 4:
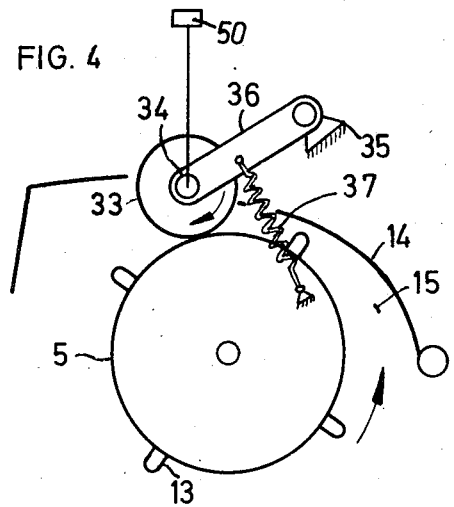
FIG. 4 is a variant construction of hay conditioning machine on a smaller scale and wherein the conditioning means are here constructed as press rolls.

FIG. 4 illustrates a hay conditioning machine where again there is provided a conveying or conveyor drum 5 equipped with conveying tools 13 and a guide wall 14 which bounds towards the top of a conveying channel 15. The conditioning means or mechanism which engage into the conveying channel 15 between the conveying tools 13 here are in the form of press rolls 33 which are spaced laterally from one another and mounted to be freely rotatable upon a common shaft 34. Pivotal levers 36 which support both ends of the shaft 34 are articulated at the fixed pivot points 35 and subjected to the tension force of the tension springs 37 in such a manner that the press rolls 33 are rotatably driven by the stream of crop material or straw or blade material which is conveyed between the press rolls 33 and the surface of the conveyor drum 5. A conditioning action occurs in two aspects at the press rolls 33 in that, such means which are effective in relation to the conveying stream exert a bending or folding action upon the straw or blade material and thereafter exert a squeezing action upon such material. In order to prevent winding up of the material at the shaft 34 it is preferable to select the diameter of the press rolls 33 to be so large that the shaft 34 is located externally of the conveying channel 15. Each press roll 33 could be also mounted individually at a respective pivotal lever so that each could accommodate itself individually to the conveyed stream of material.

Figure 5:
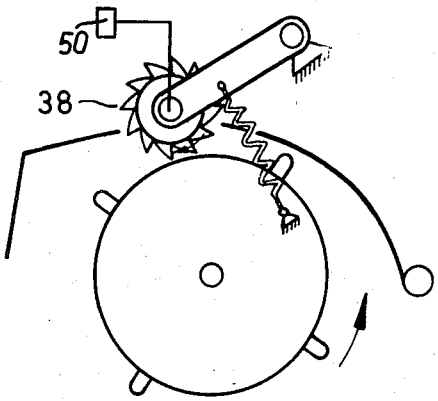
FIG. 5 is a further variant of the hay conditioning machine, similar to the showing of FIG. 4, but here employing as the conditioning means toothed discs.

FIG. 5 shows a modification of the rotating conditioning means of FIG. 4 wherein here a similar constructed hay conditioning machine is equipped with toothed discs 38. In contrast to smooth rollers of the type, for instance shown in FIG. 4, these toothed discs 38 have the advantage that they possess a more intensified destructive action which is exerted upon the material and their rotational movement is much more positive. In order to obtain particular effects it is possible for the press rolls and toothed discs of the type shown to be driven, also in a braked fashion, or by an external drive, as schematically indicated by reference character 50 in FIGS. 4 and 5.

Figure 6:
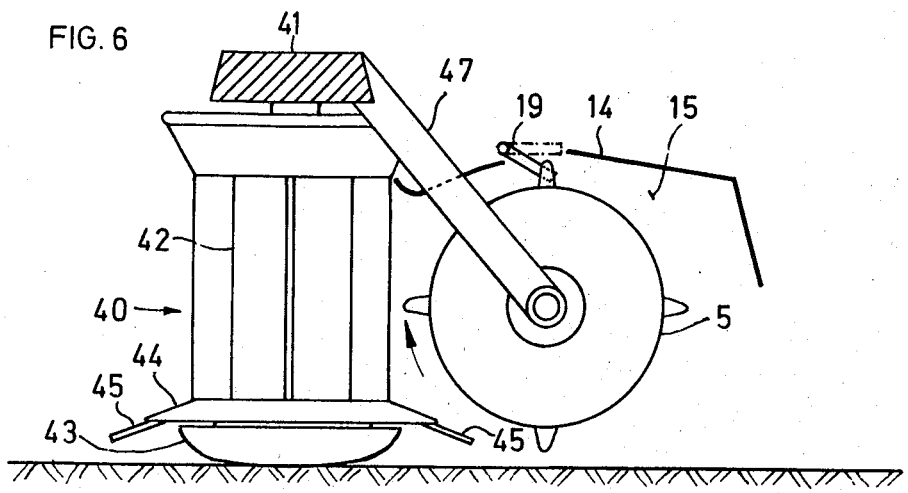
FIG. 6 is a side view of a machine unit consisting of a hay conditioning machine and a drum mower.
Figure 7:
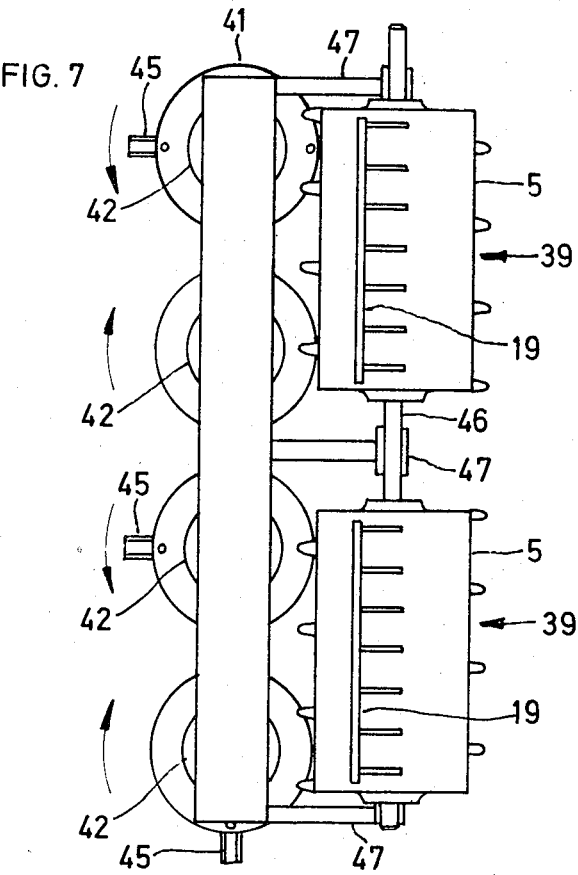
FIG. 7 is a top plan view of the machine unit depicted in FIG. 6.

FIGS. 6 and 7 show the utilization of two conditioning units 39 at a drum mower 40. This drum mower 40 consists of four cylindrical drum members 42 which rotate in pairs in opposite sense in the direction of the illustrated arrows about vertical axis or shafts secured to a transverse beam or support 41. The drums 42 are equipped with runners 43 by means of which they can slide along the ground and at their lower ends a pair of knives 45 are pivotably connected to a rim 44 of each such drum 42. Each pair of drums 42 has associated therewith a conditioning unit 39, the conveying or conveyor drums 5 of which are rotatably mounted upon a common horizontal shaft at the supports 47. The guide wall 14 which forms the conveying channel 15 in conjunction with the conveying drums 5 is connected in any suitable fashion with the supports 47. Here to preserve clarity in illustration the comb unit 19 associated with each drum 5 has only been schematically illustrated and without the adjustment mechanism therefore. Yet such may be similar to the constructions previously discussed.

The grass or other crop which is cut by the knives 45 is conveyed between each two drums 42. Under the action of the air current which is generated by the conveyor drums 5 the grass finally arrives at the operable zone of the conveying tools 13 of the conveying drums 5 and is further conveyed by such tools, under the conditioning action exerted by the combs 19, through the conveying channel 15.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A conditioning machine for agricultural materials, especially straw or blade materials or the like, comprising at least one rotatable conveying drum equipped with conveying tools for the material; said conveying tools projecting from the surface of said conveying drum and being arranged with a spacing between adjacent conveying tools, a guide wall arranged in overlying relationship in cooperative association with said conveying drum to form between the outer surface of the conveying drum and said guide wall a conveying channel for the material, conditioning means positioned in said conveying channel in order to exert a conditioning action upon the conveyed material, said conditioning means being arranged next to one another in a direction substantially parallel to the axis of said conveying drum with a lateral spacing between adjacent conditioning means and in offset relationship with respect to said conveying tools, and means for moving said conditioning means into said spaces between said conveying tools.

2. The conditioning machine as defined in claim 1, wherein said conditioning means are arranged in rows next to one another at least at one common support extending transverse to said conveying channel.

3. The conditioning machine as defined in claim 1, further including a frame unit, a disc mower combined with the frame unit of the conditioning machine for the purpose of forming a machine unit which can be coupled to an agricultural tractor and can be driven by such tractor.

4. The conditioning machine as defined in claim 1, said moving means being operable to adjust the spacing of the conditioning means with respect to the conveying drum.

5. The conditioning machine as defined in claim 2, wherein said conditioning means comprises teeth of a comb unit which extend from the guide wall at an acute angle into the conveying channel with respect thereto.

6. The conditioning machine as defined in claim 5, wherein said teeth of the comb unit possess a substantially round cross-sectional configuration and are closed at their free ends.

7. The conditioning machine as defined in claim 5, wherein said teeth of the comb unit possess a substantially elongate cross-sectional configuration, a narrow side of which extends parallel to the axis of rotation of the conveying drum.

8. The conditioning machine as defined in claim 5, wherein said guide wall possesses an opening which extends over the entire width of the conveying channel, said comb unit covering said opening.

9. The conditioning machine as defined in claim 5, wherein said guide wall is provided with slot means, and the teeth of said comb unit extending through said slot means.

10. The conditioning machine as defined in claim 5, said moving means being operable to adjust the spacing of the conditioning means with respect to the conveying drum, said moving means serving to pivotably mount the comb unit so as to be able to rock same both into its ineffectual position as well as into different working positions.

11. The conditioning machine as defined in claim 10, wherein the pivot axis of the comb unit is located externally of the conveying channel.

12. The conditioning machine as defined in claim 5, further including spring means for pre-biasing the comb unit against an impact plate and opposite to the direction of conveying of the material.

13. The conditioning machine as defined in claim 5, further including an additional comb unit so as to provide at least two comb units which are arranged behind one another with respect to the direction of said conveying channel.

14. The conditioning machine as defined in claim 13, wherein one of the comb units is located approximately at the highest location of the conveying channel and the other comb unit is arranged at an ascending portion of the conveying channel.

15. The conditioning machine as defined in claim 13, further including connection element means for operatively interconnecting the two comb units with one another and wherein both comb units are conjointly adjustable by said adjustment mechanism.

16. The conditioning machine as defined in claim 15, wherein said connection element means comprises a turnbuckle adjustable in length.

17. The conditioning machine as defined in claim 1, wherein said conditioning means comprises rotating press rolls.

18. The conditioning machine as defined in claim 17, wherein the diameter of the press rolls is selected to be so large that their axis of rotation is located externally of the conveying channel.

19. The conditioning machine as defined in claim 17, wherein said press rolls can be rotated without an external drive and are pressed by spring force against the conveying drum.

20. The conditioning machine as defined in claim 1, wherein said conditioning means comprises rotating toothed discs.

21. The conditioning machine as defined in claim 20, wherein said rotating toothed discs possess a diameter which is so large that the axis of rotation thereof is located externally of the conveying channel.

22. The conditioning machine as defined in claim 20, wherein said toothed discs can be rotated without an external drive and are pressed by spring force against the conveying drum.

23. The conditioning machine as defined in claim 17, wherein said press rolls means are provided for braking.

24. The conditioning machine as defined in claim 20, wherein said toothed discs means are provided for braking.

25. The conditioning machine are defined in claim 17, further including means for rotating said press rolls.

26. The conditioning machine as defined in claim 20, further including means for rotating said toothed discs.

27. The conditioning machine as defined in claim 19, further including a shaft upon which are rotatably mounted said press rolls, pivotable levers mounted to be pivotable at fixed pivot points for supporting said shaft, and tension spring means engaging with said pivotal levers.

28. The conditioning machine as defined in claim 22, further including a shaft upon which are rotatably mounted said press rolls, pivotable levers mounted to be pivotable at fixed pivot points for supporting said shaft, and tension spring means engaging with said pivotable levers.

29. The conditioning machine as defined in claim 1, further including a frame unit for the conditioning machine, a drum mower equipped with at least two drums combined with said frame unit of the conditioning machine for forming a machine unit which can be coupled to an agricultural tractor and driven by such.

30. The conditioning machine as defined in claim 29, wherein said drum mower embodies at least four drums, and a respective conditioning unit embodying said conditioning means arranged after each pair of drums.

* * * * *